Figure 1:
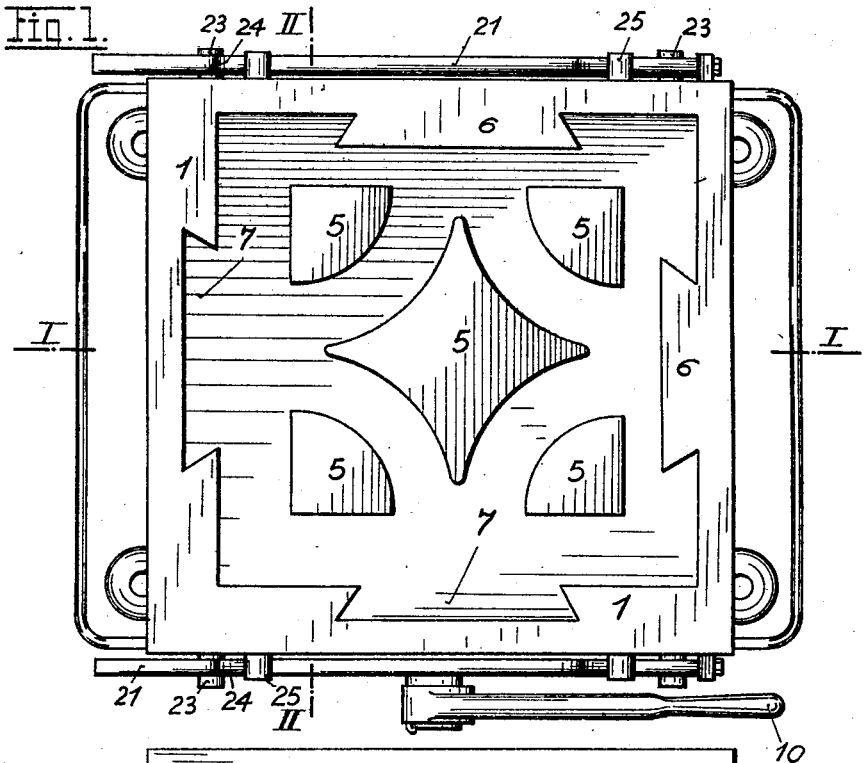

March 17, 1925.  1,529,733

A. WÜST

MOLDING MACHINE FOR THE MANUFACTURE OF BUILDING BLOCKS
AND THE LIKE FROM CONCRETE, CLAY, AND THE LIKE

Filed April 21, 1924    2 Sheets-Sheet 1

Inventor
A. Wüst
By Marks & Clerk
Attys.

March 17, 1925. 1,529,733
A. WÜST
MOLDING MACHINE FOR THE MANUFACTURE OF BUILDING BLOCKS
AND THE LIKE FROM CONCRETE, CLAY, AND THE LIKE
Filed April 21, 1924 2 Sheets-Sheet 2

Inventor
A. Wüst
By Marks & Clerk

Patented Mar. 17, 1925.

1,529,733

UNITED STATES PATENT OFFICE.

ADOLF WÜST, OF PRIBBERNOW, GERMANY.

MOLDING MACHINE FOR THE MANUFACTURE OF BUILDING BLOCKS AND THE LIKE FROM CONCRETE, CLAY, AND THE LIKE.

Application filed April 21, 1924. Serial No. 708,069.

*To all whom it may concern:*

Be it known that I, ADOLF WÜST, a citizen of Germany, and resident of Pribbernow, district Cammin, Germany, have invented certain new and useful Improvements in and Relating to Molding Machines for the Manufacture of Building Blocks and the like from Concrete, Clay, and the like, of which the following is a specification.

The subject of this invention is a molding machine for the manufacture of moulded blocks and similar building elements from concrete, clay or the like, in which the mould consists of a box-shaped frame, which, sliding on vertical guides, can be lowered by means of a system of levers and a crank gear relatively to the entirely independent bottom pattern plate until the finished moulded block is completely exposed and can be readily removed.

In molding machines of this type as used hitherto the frame of the mould is provided for this purpose with a supporting arrangement consisting of a plurality of lever arms, which of course is not capable of providing a really secure support for the molding frame. With such an arrangement it may easily happen that, when the superfluous molding material is strickled off, the frame of the mould, owing to the pressure bearing on it, may sink slightly on one side or the other, which will obviously result in the shape of the moulded blocks being uneven, which may have serious results.

The subject of the present invention is to obviate this disadvantage in a reliable manner by the frame being supported, when in the raised position, by inclined surfaces on a sliding frame capable of being displaced horizontally on the guiding columns of the molding machine. This manner of supporting the frame of the mould by a supporting frame, which is incapable of giving in the vertical direction, is so reliable that it is impossible for the frame of the mould to shift under any circumstances, even when the greatest pressure is applied.

In the drawings a constructional example of the invention is shown,

Fig. 1 being a plan view and

Figure 2:
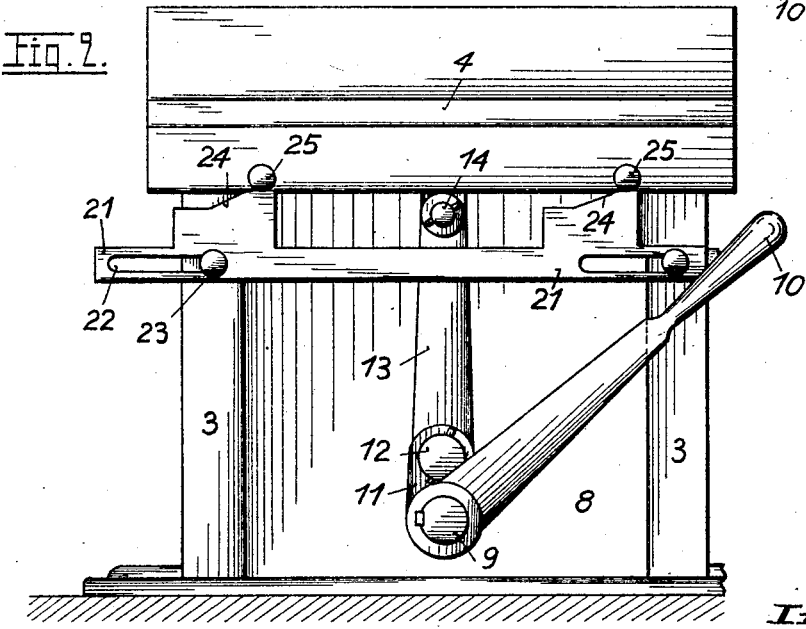
Figure 3:
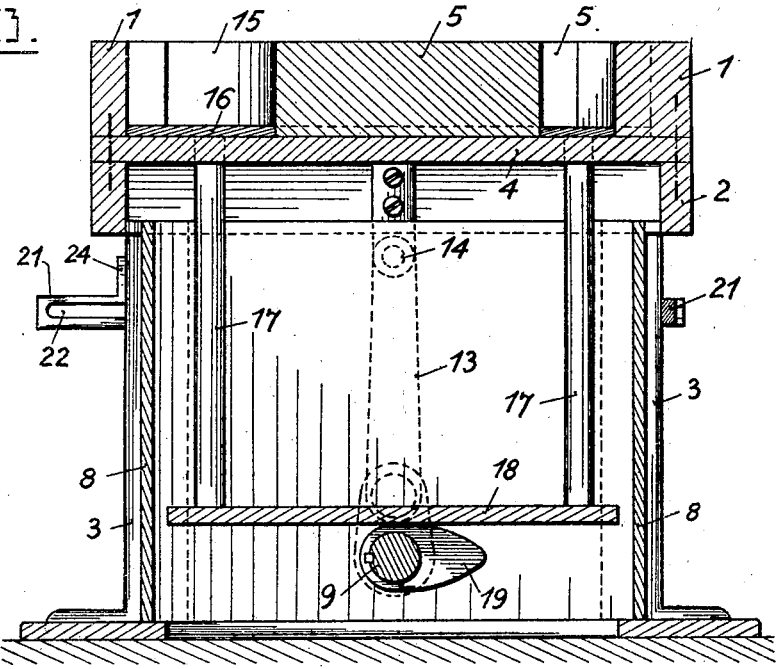

Fig. 2 a side elevation of the molding machine,

Fig. 3 a section on line I—I and

Figure 4:
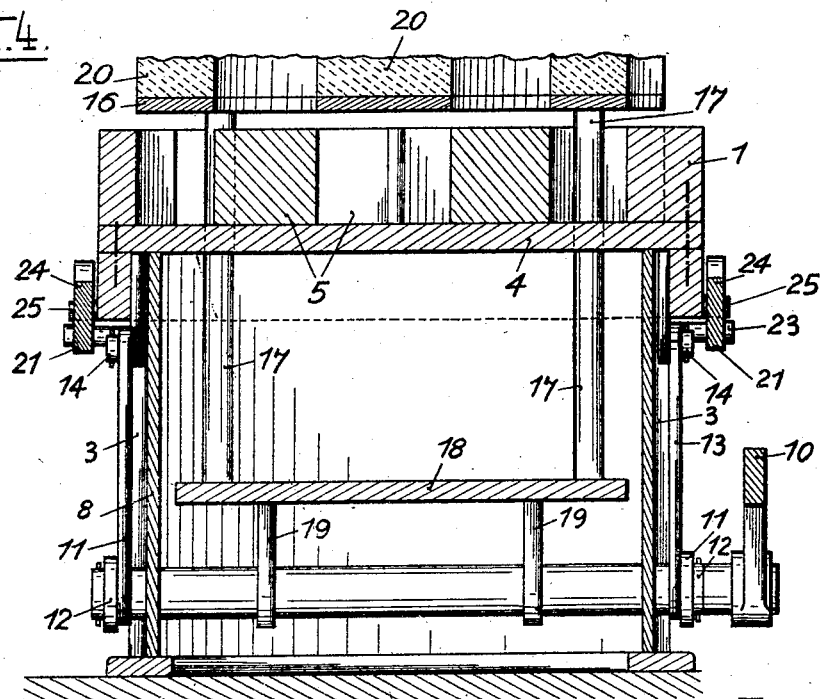

Fig. 4 a section on line II—II of Fig. 1.

As will be seen from the drawings, the molding machine consists substantially of a box-shaped frame 1, which is adapted to slide vertically on its lower edge 2 on the upper ends of the guides 3 made of angle-iron. When making the moulded block the frame 1 acts as the molding box and is provided for this purpose with a loose bottom 4, on which the core pieces 5 are fixed by means of screws or in any other suitable manner. These core pieces can of course be changed, as required, for other core pieces of a suitable shape according to the shape of the holes to be provided in the moulded block. On any two sides of the inner edge of the frame 1 projecting pieces 6 are provided for forming the recesses to be provided on the outer surfaces of the block, while recesses 7 are provided in the two other sides for forming the corresponding projections on the block. In order to enable the frame 1 to be raised and lowered conveniently, as required, the following arrangement is provided:

In the lower part of the side walls 8 connecting the guides 3 a shaft 9 is journalled, which is adapted to be turned in both directions by means of a hand-lever 10 fixed to one end of the said shaft. On both ends of the shaft externally of the lateral walls 8, a short crank 11 is mounted, which is connected by means of a crank pin 12 and a connecting rod 13 to a pin 14 fixed to the lower edge 2 of the frame 1. When the lever 10 is in the position shown in Figs. 1 and 2, the molding box formed by the frame 1 will be in its upper extreme position and, on the lever 10 being thrown over into the opposite position, the molding box will slide downwards on the vertical guides 3 into the position shown in Fig. 4. For making the moulded block a pattern plate 16 of metal or the like is placed in the hollow space 15 of the frame 1, the shape of which must of course correspond exactly to the inner shape of the frame 1 and the core pieces 5. When the frame is raised, the pattern plate 16 rests on the bottom plate 4 of the frame (Fig. 3) and, when the frame is lowered (Fig. 4), is supported by four or more columns 17, the upper ends of which slide in the corresponding holes in the bottom 4 of the frame and the lower ends of which are fixed in a supporting plate 18. In order to keep the stroke of the frame 1 and the swing of the lever 10 as small as possible, means are provided for enabling the plate 18 with the supporting columns 17 and consequently the pattern plate 16 to be raised simultaneously with the lowering of the frame 1, until the plate 16 is entirely exposed above the upper edge of the frame 1. For this purpose a suitable shaped cam 19 is mounted on either end of the shaft 9 within the lateral walls 8 at a certain angular distance from the cranks 11. On the lever 10 being turned into the position for lowering the frame 1, the said cam will raise the supporting plate 18 together with the columns 17 and the supporting plate 16. The latter is entirely independent of the columns 17 supporting it, so that, after the frame 1 has been lowered, it can be removed together with the finished moulded block 20 resting on it without difficulty. For supporting the frame 1 in its raised position and to give it the necessary rigidity, when the material is rammed into the mould, a sliding frame 21 is provided on each side on the vertical guides 3, which frame is capable of being slid horizontally by means of slotted guides 22 on pins 23. On the upper edge of this sliding frame close to each corner of the molding box 1, an inclined surface 24 is provided, which has the shape shown in Fig. 2, which engages under the pin 25 fixed to the side of the frame 1, when the parts are in the position shown in Fig. 2. On the sliding frame 21 being slid into the position shown in Fig. 2, the frame 1 will thus be supported in a reliable manner at all four corners, so that it cannot be moved out of its position by the pressures and blows occurring, when the material is rammed into the mould. By the supporting edge of the inclined surfaces 24 being made inclined or slightly S-shaped, the height of the frame 1 can be adjusted as desired within certain limits, so that the moulded block can in each case be given the required thickness.

The molding machine described above is operated in the following manner:

After the core pieces 5 of the shape required for the moulded block have been fixed on the bottom 4 of the frame 1 and the frame has been moved into its upper extreme position by means of the lever 10, the sliding frame 21 is slid into the position shown in Fig. 2 for giving support to the molding box and the pattern plate 16 is placed in the hollow space 15 of the frame 1. The remainder of the hollow space of the frame 1 is thereupon filled with the material, which is firmly rammed in the usual way. The upper surface of the material is thereupon smoothed over with a strickle and the superfluous material removed from the upper edge of the molding box. After the block has been completely moulded in this manner, the sliding frame 21 is pushed back again in the guiding slots 22, until the inclined surfaces 24 leave the pins 25. By throwing the lever 10 over into the opposite position, the frame 1 is lowered on the guides 3, the supporting plate 18, the columns 17 and the supporting plate 16, together with the block 20 resting thereon being raised at the same time. When the lever 10 has reached its other extreme position, the supporting plate 16 with the block 20 resting on it, will lie completely exposed above the upper edge of the frame 1 and can readily be removed for the purpose of being dried or stoved or baked according to the kind of material used. The lever 10 is again moved into the position shown in Fig. 2, whereby the frame 1 is again raised and the operation is repeated in the manner described above.

As was stated above, moulded blocks and other building elements for the construction of fences, garden walls and the like can be made by anyone not skilled in the art at the place where they are to be used without any previous knowledge in a quick and convenient manner and in any desired quantity.

What I claim is:

1. A molding machine for the manufacture of building blocks and the like from concrete, clay or the like, comprising in combination a mould consisting of a box-shaped frame a loose bottom pattern plate in the said mould, vertical guides for the said mould, a system of levers and a crank gear for raising the mould and for lowering it relatively to the said bottom pattern plate, until the said plate with the finished moulded block is completely exposed and can be readily removed, a sliding frame below the said mould, capable of sliding horizontally on guides on the machine, inclined surfaces on the sliding frame for supporting the mould when in its raised position and means for temporarily fixing the sliding frame, as and for the purpose set forth.

2. A molding machine for the manufacture of building blocks and the like from concrete, clay or the like, comprising in combination a mould consisting of a box-shaped frame, a loose bottom pattern plate in the said mould, vertical guides for the said mould, a system of levers and a crank gear for raising the mould and for lowering it relatively to the said bottom pattern plate, until the said plate with the finished moulded block is completely exposed and can be readily removed, a sliding frame below the said mould, capable of sliding horizontally on guides on the machine, inclined surfaces on the sliding frame for supporting the mould when in its raised position, means for temporarily fixing the sliding frame, pins on the mould capable of engaging with the said inclined surfaces and means for causing the said raising and lowering means for the mould to operate the sliding frame positively in such a manner that, when the mould is in its highest position, the inclined surfaces on the sliding frame are under the pins on the mould and are removed from the said pins before the downward movement of the molding box commences, as and for the purpose set forth.

In testimony whereof I have signed this specification in the presence of two witnesses.

ADOLF WÜST.

Witnesses:
 EDGAR JAHN,
 W. CAL. ENDEE.